United States Patent [19]

Yoshida

[11] Patent Number: 6,046,819
[45] Date of Patent: Apr. 4, 2000

[54] PRINTING HEAD AND IMAGE DATA PRINTING METHOD FOR USE WITH A COLOR INK-JET PRINTER OF AN INTERLACE DRIVE SYSTEM

[75] Inventor: Yasunari Yoshida, Ama-gun, Japan

[73] Assignee: Brother Kogyo Kabushiki Kaisha, Nagoya, Japan

[21] Appl. No.: 09/027,675

[22] Filed: Feb. 23, 1998

[30] Foreign Application Priority Data

Feb. 25, 1997 [JP] Japan ..................................... 9-040946

[51] Int. Cl.[7] ....................................................... G06F 15/00
[52] U.S. Cl. ............................................. 358/1.8; 347/15
[58] Field of Search ............................. 358/1.1, 1.2, 1.3, 358/1.4, 1.5, 1.8, 1.12, 500, 502, 505, 530, 448; 395/101, 102, 103, 104, 105, 108, 111; 347/1, 11, 12, 15, 40, 41, 42, 44, 55, 63, 111, 115, 116

[56] References Cited

U.S. PATENT DOCUMENTS

| | | | |
|---|---|---|---|
| 4,198,642 | 4/1980 | Gamblin | 347/41 |
| 4,401,991 | 8/1983 | Martin | 347/41 |
| 4,809,016 | 2/1989 | Padalino | 347/41 |
| 4,920,355 | 4/1990 | Katerberg | 347/41 |
| 4,967,203 | 10/1990 | Doan et al. | 347/41 |
| 5,059,984 | 10/1991 | Moore et al. | 347/41 |
| 5,070,345 | 12/1991 | Lahut et al. | 347/41 |
| 5,079,571 | 1/1992 | Eriksen | 347/43 |
| 5,239,312 | 8/1993 | Merna et al. | 347/41 |
| 5,300,950 | 4/1994 | Lopez et al. | 347/41 |
| 5,300,957 | 4/1994 | Burke | 502/402 |
| 5,485,183 | 1/1996 | Zandian et al. | 347/41 |
| 5,625,389 | 4/1997 | Eriksen et al. | 347/41 |
| 5,638,107 | 6/1997 | Curry | 347/234 |
| 5,686,944 | 11/1997 | Takagi et al. | 347/41 |

*Primary Examiner*—Dov Popovici
*Assistant Examiner*—Gabriel I. Garcia
*Attorney, Agent, or Firm*—Oliff & Berridge, PLC

[57] ABSTRACT

A printing head includes P=3 ink supplying portion arrangement sections having n=4 nozzles effectively used and a length L in a sub-scanning direction continuously disposed in the sub-scanning direction and in which the nozzles are disposed in m-th arrangement nominated section within P arrangement nominated sections which are defined by equally dividing, by P, the n individual arrangement sections having a length L/n in the sub-scanning direction which are defined by equally dividing the length by n in respective ink supplying portion arrangement sections. This m is the same number within each ink supplying portion arrangement section but different among the ink supplying portion arrangement sections. Thus, in the interlace drive system printing, it is possible to eliminate striped patterns even in the sections of the same color.

6 Claims, 11 Drawing Sheets

→ MAIN SCAN

↓ SUB-SCAN

|    | | | | | | | |
|----|----|----|----|----|----|----|----|
| Od | 15 | 49 | 7  | 57 | 14 | 52 | 6  | 60 |
| Ev | 47 | 31 | 39 | 23 | 46 | 30 | 38 | 22 |
| Od | 3  | 63 | 11 | 55 | 2  | 62 | 10 | 54 |
| Ev | 35 | 19 | 43 | 27 | 34 | 18 | 42 | 26 |
| Od | 13 | 51 | 5  | 59 | 16 | 50 | 8  | 58 |
| Ev | 45 | 29 | 37 | 21 | 48 | 32 | 40 | 24 |
| Od | 1  | 61 | 9  | 53 | 4  | 64 | 12 | 56 |
| Ev | 33 | 17 | 41 | 25 | 36 | 20 | 44 | 28 |

FIG. 14B
RELATED ART

→ MAIN SCAN

↓ SUB-SCAN

| 3 |  |  |  | 2 |
|---|---|---|---|---|
|   |   |   |   |   |
|   |   |   |   |   |
|   |   |   |   |   |
| 1 |   |   |   | 4 |

FIG. 15
RELATED ART

→ MAIN SCAN

↓ SUB-SCAN

|    | | | | | | | |
|----|----|----|----|----|----|----|----|
| Od | 15 |    | 7  |    | 14 |    | 6  |    |
| Ev |    |    |    |    |    |    |    |    |
| Od | 3  |    | 11 |    | 2  |    | 10 |    |
| Ev |    |    |    |    |    |    |    |    |
| Od | 13 |    | 5  |    | 16 |    | 8  |    |
| Ev |    |    |    |    |    |    |    |    |
| Od | 1  |    | 9  |    | 4  |    | 12 |    |
| Ev |    |    |    |    |    |    |    |    |

PRINTING HEAD AND IMAGE DATA PRINTING METHOD FOR USE WITH A COLOR INK-JET PRINTER OF AN INTERLACE DRIVE SYSTEM

CROSS REFERENCE TO RELATED APPLICATION

This application relates to and incorporates herein by reference Japanese Patent Application No. 9-40946 filed on Feb. 25, 1997.

BACKGROUND OF THE INVENTION

1. Field of the Invention

The present invention relates to a printing head for use with a color ink-jet printer of an interlace drive system or the like and an image data printing method using such printing head.

2. Description of Prior Art

In a printing apparatus for printing image data by moving a printing head relative to a printable medium such as a sheet of paper, as important factors which affect a printing quality, there are enumerated a transport accuracy with which the printable medium is transported in the sub-scanning direction and a printing position accuracy of printing head. For achieving this transport accuracy and the printing position accuracy, there is enumerated an interlace drive system.

The interlace drive system includes a printing head comprising a plurality of nozzle (ink-jet section) arrays spaced apart in the sub-scanning direction by an interval of an integer multiple of a printing resolution in which a nozzle space P and a nozzle number q (not the number of existing nozzles but the number of nozzles in actual use) are mutually prime, and prints adjacent lines by different nozzles while a printable medium is being fed at a constant pitch in the sub-scanning direction.

According to the printing apparatus of interlace drive system, since a fluctuation in the interval in which the nozzles are spaced apart does not remarkably affect the printing quality and the transport amount of the printable medium is always constant, a fluctuation in the transport accuracy is small, and hence a high printing quality can be provided. Furthermore, since the interval of the nozzles which are disposed is wide, even a printing head of high resolution can be manufactured with ease.

However, of the printing apparatus of interlace drive system, when, in particular, a printer of a type such as a color ink-jet printer for printing an image by ink supplying is used to print binary pseudo gray-scale (middle-tone) image data provided by a dot-distribution type dither matrix, there may occur the following problems.

Figure 14A:
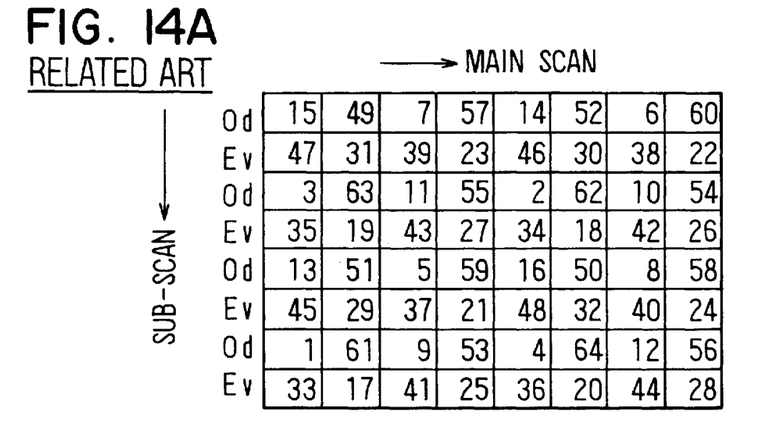
FIGS. 14A and 14B are diagrams showing a dither matrix and a fundamental layout pattern in a prior art, respectively.
Figure 14B:
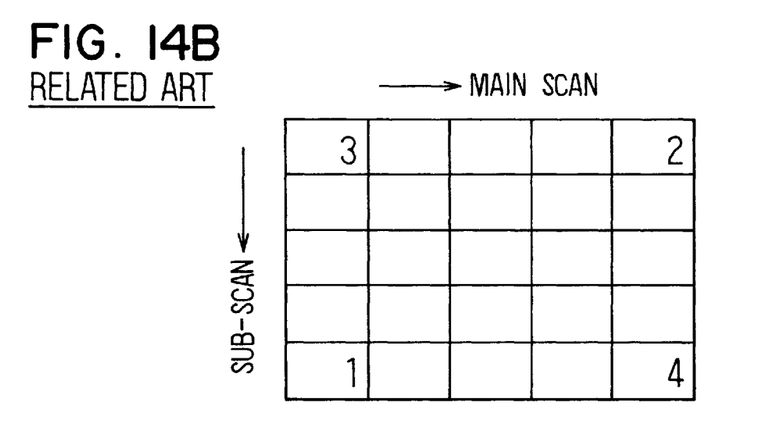

For example, the problem caused by the dot-distribution dither matrix in which the nozzle number=63 (63 in actual practice out of the existing nozzle number=64), the nozzle space S=2 and gradation level of gray-scale image lies in a range of from 1 to 64 as shown in FIG. 14A will be described below. This dither matrix is formed by repeatedly disposing a fundamental layout pattern of threshold values shown in FIG. 14B.

Figure 15:
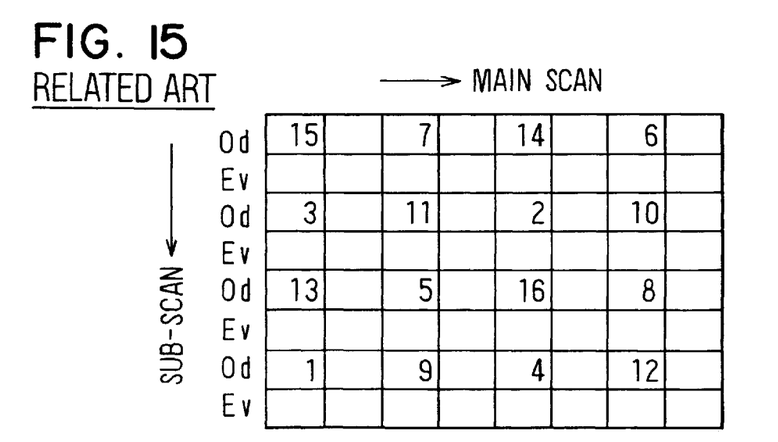
FIG. 15 is a diagram showing the binary image data provided by the dither matrix in the prior art.

When an image in which all pixels comprise C (cyan)=16, M (magenta)=0 and Y (yellow)=32 is binary-processed as a multiple-value gray-scale image, the position at which C is ON (position at which ink of C is jetted) is located on the odd-numbered line Od in the lines of the dither matrix as shown in FIG. 15.

Figure 16:
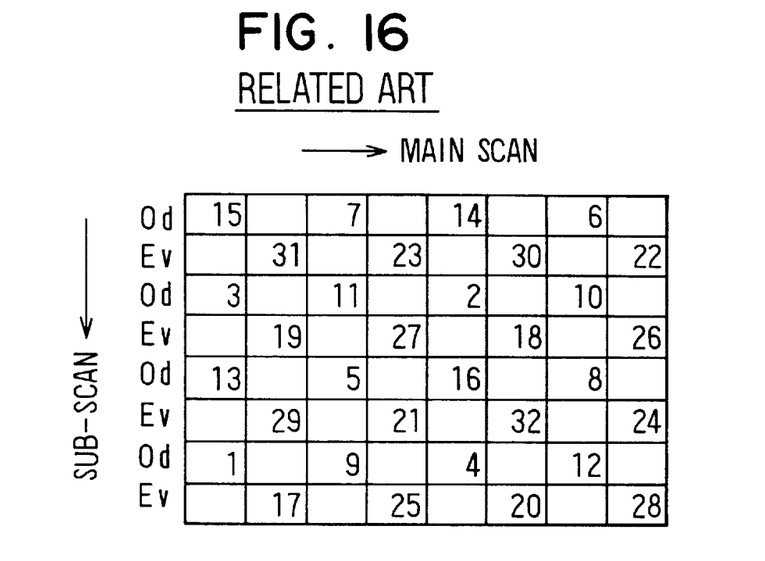
FIG. 16 is a diagram showing the binary image data provided by the dither matrix in the prior art.

The position at which Y is ON (position at which ink of Y is jetted) is located at the same position at which C is ON and on the even-numbered line Ev as shown in FIG. 16.

Figure 17:
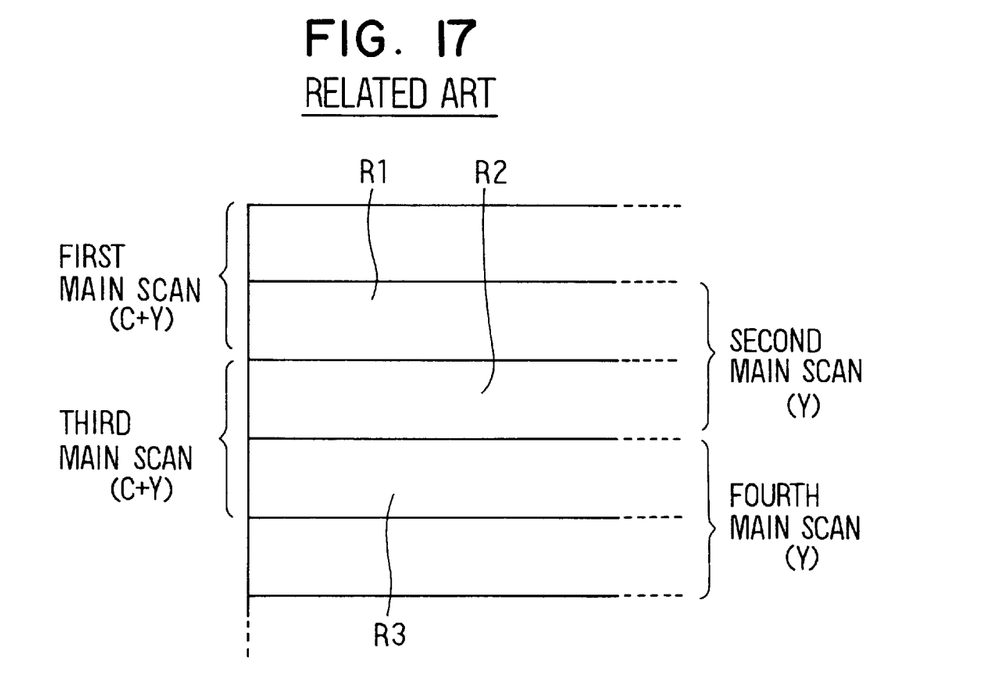
FIG. 17 is a diagram showing the printed state provided by the printing head of the interlace drive system in the prior art.

When the thus binary-processed pseudo-gray-scale image is printed by the interlace drive system, initially, only odd-numbered lines Od are printed by using 63 nozzles per each color in the first main scan as shown in FIG. 17. As is clear from FIGS. 15 and 16, C and Y are printed on the odd-numbered lines Od, and hence inks of C and Y of the same ratio are jetted.

The printing head is relatively moved (sub-scanning) by an amount of 32 nozzles in the sub-scanning direction, and the printing apparatus prints image data by the second main scanning. Only the even-numbered line Ev is printed by the second main scanning. Since only Y is ON as is clear from FIGS. 15 and 16, only Y is printed.

The printing head is relatively moved by an amount of 32 nozzles in the sub-scanning direction, and the printing apparatus prints image data by the third main scanning. Since only the odd-numbered line Od is printed by the third main scanning, inks of C and Y are jetted similarly to the first main scanning.

In the next fourth main scanning, only inks of Y are jetted similarly to the second main scanning.

In this way, an image of the same coloring with C (cyan)=16, M (magenta)=0 and Y (yellow)=32 is printed with a resolution twice as high as the interval of the nozzles.

However, since the printing apparatus is of the type of the interlace drive system, as shown in FIG. 17, inks of C and Y are jetted first and inks of Y are jetted later in a print overlapping area R1 of the first main scanning and the second main scanning. In a print overlapping area R2 of the second main scanning and the third main scanning, inks of Y are jetted first and inks of C and Y are jetted later. In a print overlapping area R3 of the third main scanning and the fourth main scanning, inks of C and Y are jetted first and inks of Y are jetted later similarly to the overlapping area R1.

Since the overlapping areas R1 to R3 are the same coloring areas, inks of C and Y of the same amount are jetted. However, the orders in which inks are jetted are different in the adjacent overlapping areas R1 to R3. Inks jetted on the even-numbered line Ev and inks jetted on the odd-numbered line Od are not independent perfectly but overlap with each other in the portion in which their lines are adjacent to each other. If the order of overlapped inks is reversed in this overlapping portion due to the error of the order in the ink-jet, then a small difference of features between the inks such as a degree of blur causes a small difference to occur from a standpoint of color. As a consequence, although the overlapping areas R1, R2, R3 are the same coloring areas as the gray-scale image, they are reproduced as striped patterns.

Figure 18:
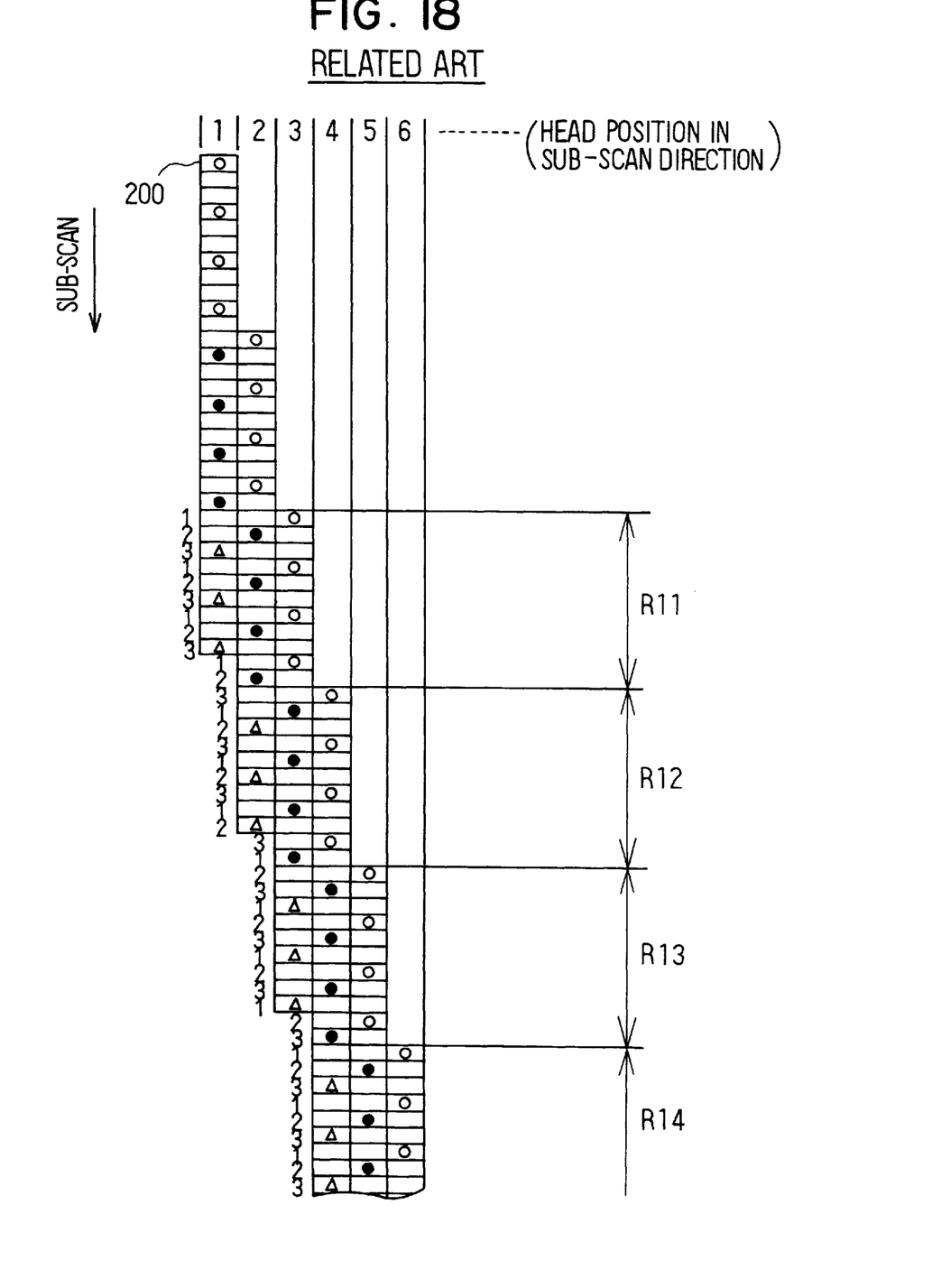
FIG. 18 is a diagram showing the printed state provided by the printing head of the interlace drive system in the prior art.

In the above example, there has been described so far the interlace drive system in which the printing head scans alternately odd 2s+1-th line and even 2 (s+1)-th line (s is an integer not less than 0), i.e., at the unit of 2 lines. A similar phenomenon occurred in the interlace drive system in which odd-numbered line and even-numbered line are alternately scanned at the unit of not less than 3 lines. FIG. 18, for example, shows an example of another interlace drive system in which printing heads 200 are spaced apart at the unit of 3 lines by 2 nozzles between the nozzles and printing 3s+1-th line, 3s+2-th line and 3(s+1)-th line (s is an integer not less than 0) by moving relatively the printing head 200 by an amount of substantially ⅓ of the length of the printing head 200 in the sub-scanning direction. Although the printing heads 200 are provided for respective colors, only one printing head 200 is shown in order to facilitate the understanding. In FIG. 18, an reference numerals arrayed in the lateral direction denote numbers indicating positions of the printing head 200 in the sub-scanning direction, respectively. With respect to reference numerals described along the printing head 200, "1" denotes 3s+1-th line, "2" denotes 3s+2-th line and "3" denotes 3(s+1)-th line, respectively.

Also in this case, in the first overlapping area R11 (printing based on the positions 1, 2, 3 in the sub-scanning direction), the printing head 200 prints lines in the sequential order of 3(s+1)-th line, 3s+2-th line, 3s+1-th line (i.e., in the sequential order of "321"). However, in the next overlapping area R12 (printing based on the positions 2, 3, 4 in the sub-scanning direction), the printing head 200 prints lines in the sequential order of 3s+2-th line, 3s+1-th line, 3(s+1)-th line (i.e., in the sequential order of "213"). In the next overlapping area R13 (printing based on the positions 3, 4, 5 in the sub-scanning direction), the printing head 200 prints lines in the sequential order of 3s+1-th line, 3(s+1)-th line, 3s+2-th line (i.e., in the sequential order of "132"). Further, in the next overlapping area R14 (printing based on the positions 4, 5, 6 in the sub-scanning direction), the printing head 200 prints lines in the sequential order of 3(s+1)-th line, 3s+2-th line and 3s+1-th line (i.e., in the sequential order of "321").

Accordingly, if the size of the fundamental layout pattern of the threshold values in the sub-scanning direction is a multiple of 3+1 and printed lines are deviated on a specific lines within 3s+1-th line, 3s+2-th line and 3(s+1)-th line at a in certain concentration, then the orders in which colors are overlapping become different in the areas of the same color, thereby resulting in striped patterns.

SUMMARY OF THE INVENTION

It is an object of the present invention to provide a printing head and an image data printing method in which striped patterns can be prevented from being caused in the areas of the same color in the interlace drive system printing.

A printing head according to the present invention assumes P ink supplying portion arrangement sections. The length of the P ink supplying portion arrangement sections is L as a length in the sub-scanning direction. The length of the ink portion arrangement sections is the length of the sections, and hence a material which makes the printing head does not always exist over the length of the ink supplying portion arrangement section.

Each of the P ink supplying portion arrangement sections includes individual arrangement sections having a sub-scanning direction L/n which results from equally dividing the length L of the ink supplying portion arrangement section by the number n of ink supplying portions (e.g., ink-jet nozzles).

Each of the individual arrangement sections includes arrangement nominated sections which result from equally dividing the individual arrangement section by the number P of the ink supplying portion arrangement sections. The ink supplying portion is disposed in any one of the arrangement nominated sections which includes each individual arrangement section.

The position at which the ink supplying portion is disposed in the arrangement nominated section is the same within each of the ink supplying portion arrangement sections. However, the same array position is not selected among the ink supplying portion arrangement sections.

Accordingly, the printing head thus arranged is provided at every ink color, and image data is printed according to the interlace drive system. That is, each time these printing heads are moved relatively by the length L relative to a printable medium in the sub-scanning direction, image data is printed at respective positions in the main scanning direction by using the printing head.

Thus, when a color image is printed by using the printing head in accordance with the interlace drive system, colors can constantly be located in the same sequential order, and hence the order in which colors are located can be prevented from being fluctuated among the sections. Thus, in the printing of the interlace drive system, it is possible to prevent striped patterns from being produced in the sections of the same color.

The fact that the ink supplying portion arrangement sections are continuously located in the sub-scanning direction means that the overlapping sections do not exist in the main scanning direction. However, the overlapping sections do not exist as the sections. The material which makes the printing head may overlap or may not overlap or a clearance may be produced in the material.

The ink supplying portion arrangement sections may be disposed linearly in the sub-scanning direction, for example, or may be disposed obliquely in the direction between the sub-scanning direction and the main scanning direction. Furthermore, the ink supplying portion arrangement sections may be disposed in a circular arc fashion. In other words, the ink supplying portion sections may be disposed arbitrarily so long as the above relationship is satisfied in at least the sub-scanning direction.

If the ink supplying portion arrangement sections are disposed linearly in the sub-scanning direction, then the width of the printing head can be reduce sufficiently. Thus, in a color printer or the like, even when ink supplying portion arrangement sections of ink colors are laminated in application, the width of the printing head can be reduced.

As the printing head, there may be enumerated an ink-jet type printing head including nozzles as ink supplying portions, for example. In addition, an impact dot type, a thermal-transfer type and a sublimation type may be enumerated as printing heads.

BRIEF DESCRIPTION OF THE DRAWINGS

Other objects, features and advantages of the present invention will be made more apparent by the following detailed description with reference to the accompanying drawings. In the drawings.

DETAILED DESCRIPTION OF THE PREFERRED EMBODIMENT

The present invention will be described hereunder with reference to various embodiments in which a printing head is used in a color printer.

First Embodiment

A printing head assembly 2 is formed by stacking four printing heads 4, 6, 8, 10. The printing heads 4, 6, 8, 10 are for respective inks of C (cyan), M (magenta), Y (yellow) and B (black).

Figure 1:
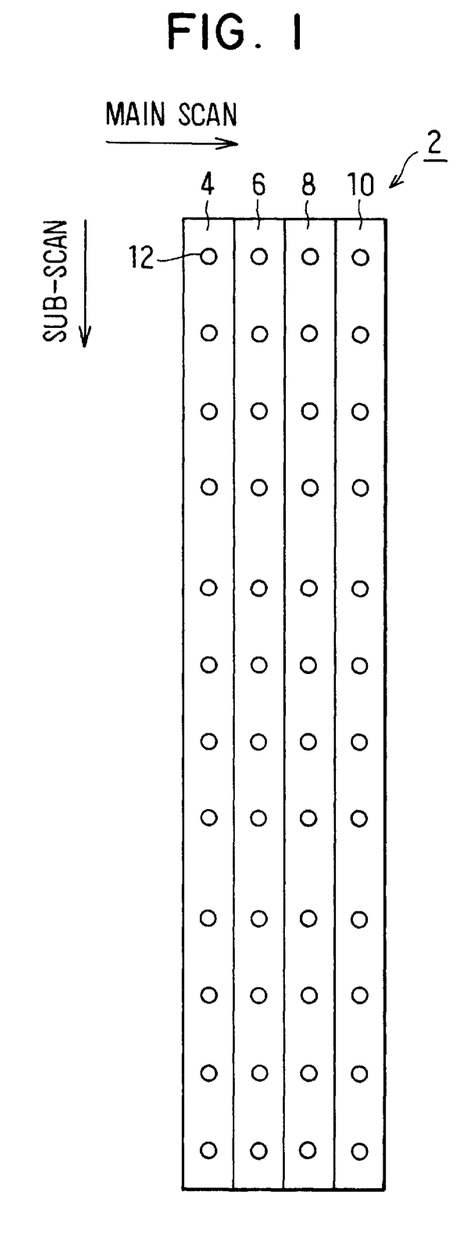
FIG. 1 is a diagram showing a main portion of a printing head according to a first embodiment of the present invention.
Figure 2:
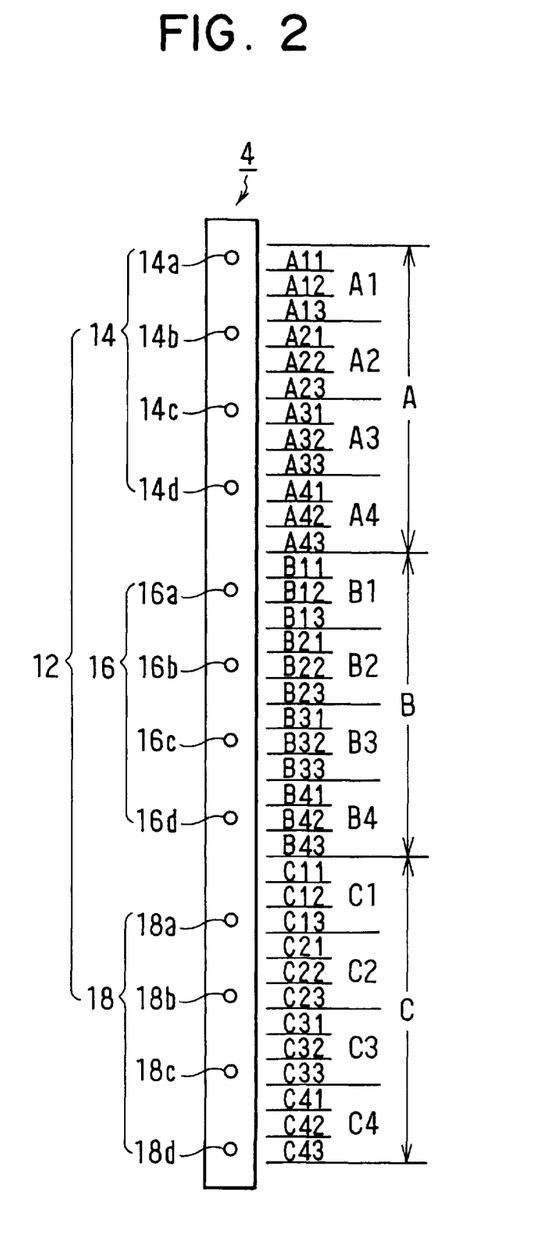
FIG. 2 is a diagram showing the arrangement of nozzles of the printing head according to the first embodiment of the present invention.

Each of the printing heads 4, 6, 8, 10 includes 12 nozzles 12 as ink supplying arrangement sections. The nozzles 12 are disposed in the printing head 4 as shown in FIG. 2. Since the nozzles 12 of other printing heads 6, 8, 10 are disposed in the same manner, the following description is directed to only the printing head 4 for brevity.

The nozzles (clooectively referred to as nozzle) 12 in the printing head 4 is divided into three groups 14, 16, 18 and disposed in any of three ink supplying arrangement sections A, B, C. All of the ink supplying arrangement sections A, B, C are the same in length in the sub-scanning direction.

The ink supplying arrangement section A is equally divided by four (number of nozzles of each group) to provide four individual arrangement sections A1, A2, A3, A4. Similarly, other ink supplying arrangement sections B, C are equally divided by four (number of nozzles of each group) to provide individual arrangement sections B1, B2, B3, B4 and C1, C2, C3, C4.

Further, these individual arrangement sections A1, A2, A3, A4, B1, B2, B3, B4, C1, C2, C3, C4 are each equally divided by three (number of ink supplying arrangement sections), and hence include three arrangement nominated sections A11, A12, A13, A21, A22, A23, A31, A32, A33, A41, A42, A43, B11, B12, B13, B21, B22, B23, B31, B32, B33, B41, B42, B43, C11, C12, C13, C21, C22, C23, C31, C32, C33, C41, C42, C43.

In the first group 14 of the nozzle 12, its four nozzles are respectively disposed in the four individual arrangement sections A1, A2, A3, A4. Of the four nozzles, in the individual arrangement section Al, the nozzle 14a is formed in the first arrangement nominated section All of the three arrangement nominated sections A11, A12, A13. In other individual arrangement sections A2, A3, A4, the nozzles 14b, 14c, 14d are formed in the first arrangement nominated sections A21, A31, A41, respectively.

In the second group 16 of the nozzle 12, its four nozzles are disposed in the four individual arrangement sections B1, B2, B3, B4, respectively. Of the four nozzles, in the individual arrangement section B1, the nozzle 16a is formed in the second arrangement nominated section B12 of the three arrangement nominated sections B1, B12, B13. In other individual arrangement sections B2, B3, B4, the nozzles 16b, 16c, 16d are formed in the second arrangement nominated sections B22, B32, B42, respectively.

In the third group 18 of the nozzle 12, its four nozzles 18a, 18b, 18c, 18d are disposed in the four individual arrangement sections C1, C2, C3, C4, respectively. Of the four nozzles, in the individual arrangement section C1, the nozzle 18a is formed in the third arrangement nominated section C13 of the three arrangement nominated sections C1, C12, C13. In other individual arrangement sections C2, C3, C4, the nozzles 18b, 18c, 18d are formed in the third arrangement nominated sections C23, C33, C43, respectively.

This arrangement relationship of the nozzles 12 can be expressed by the following relationship.

Specifically, there are disposed n (n is an integer not less than 1, where n=4 in the first embodiment) nozzles which are used effectively. Each nozzle 12 includes an array of P (P is an integer not less than 2, where P=3 in the first embodiment) ink supplying arrangement sections having a sub-scanning direction length L in the sub-scanning direction. In each of the ink supplying arrangement sections A, B, C, the nozzle is disposed at the m-th arrangement nominated sections of P arrangement nominated sections A11 to A43, B11 to B43, C11 to C43 which are assumed to be provided by further equally dividing by P the n individual arrangement sections A1 to A4, B1 to B4, C1 to C4 of which the sub-scanning direction length which is assumed by equally dividing the length by n is L/n. The number m is the same number in each of the ink supplying arrangement sections A, B, C, and the same number is not set among the ink supplying arrangement sections A, B, C. That is, in the first embodiment, m=1 in the ink supplying arrangement section A, m=2 in the ink supplying arrangement section B, and m=3 in the ink supplying arrangement section C.

Figure 3:
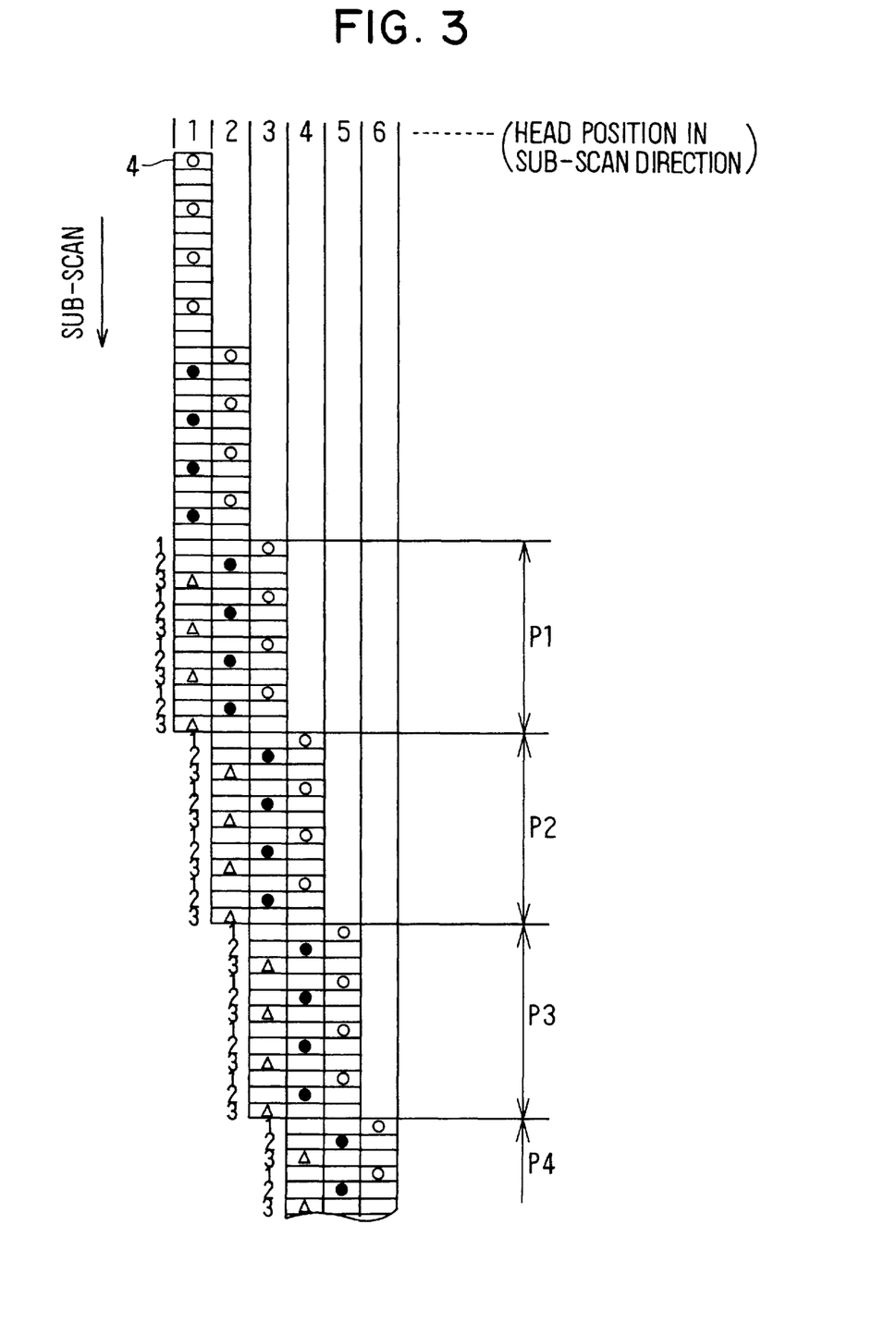
FIG. 3 is a diagram showing the printed state provided when image data is printed by using a printing head assembly of the first embodiment according to the interlace drive system.

FIG. 3 shows the printed state provided when image data is printed by using the printing head assembly 2 thus arranged in the interlace drive system in which image data is printed in the main scanning direction at each position by using the printing head assembly 2 each time the printing head is moved relatively by a length of one arrangement nominated section in the sub-scanning direction. In this case, only one printing head 4 within the printing head assembly 2 is illustrated for brevity. Similarly in the following embodiments, reference numerals arrayed in the lateral direction in FIG. 3 are numbers indicative of the positions of the printing head 4 in the sub-scanning direction. In reference numerals that are described along the printing head 4, "1" denotes 3s+1-th line, "2" denotes 3s+2-th line and "3", denotes 3(s+1)-th line [s is an integer not less than 0].

The printing head assembly 2 prints overlappingly the first overlapping area P1 three times according to the interlace drive system in the sequential order of 3(s+1)-th line, 3s+2-th line, 3s+1-th line (i.e., in the sequential order of "321"). The printing head assembly 2 prints the next overlapping area P2 in the sequential order of 3(s+1)-th line, 3s+2-th line, 3s+1-th line similarly to the first overlapping area P1. The printing head assembly 2 will print all of the following overlapping areas P3, P4, . . . in the sequential order of 3(s+1)-th line, 3s+2-th line, 3s+1-th line similarly to the first overlapping area P1.

In the printing executed by the nozzle array shown in FIG. 18 and in accordance with the interlace drive system, ink is jetted in the different sequential orders in the overlapping areas R11 to R14 with the result that striped patterns are produced in the sections of the same color. However, when image data is printed by using the printing head assembly according to the first embodiment of the present invention in the interlace drive system, it is possible to prevent striped patterns from being produced.

The positions of the arrangement nominated sections of the nozzle 12 within the individual arrangement sections A1, A2, A3, A4, B1, B2, B3, B4, C1, C2, C3, C4 are the same among the ink supplying arrangement sections A, B, C, and it is sufficient that the same position may not exist among the ink supplying arrangement sections A, B, C. Therefore, the groups 14, 16, 18 of the nozzle 12 shown in FIG. 2 may not limited to the sequential order of the group 14, the group 16, the group 18 and may be arranged as shown in the following second embodiment. The sequential order of the groups 14, 16, 18 may be combined arbitrarily.

Second Embodiment

Figure 4:
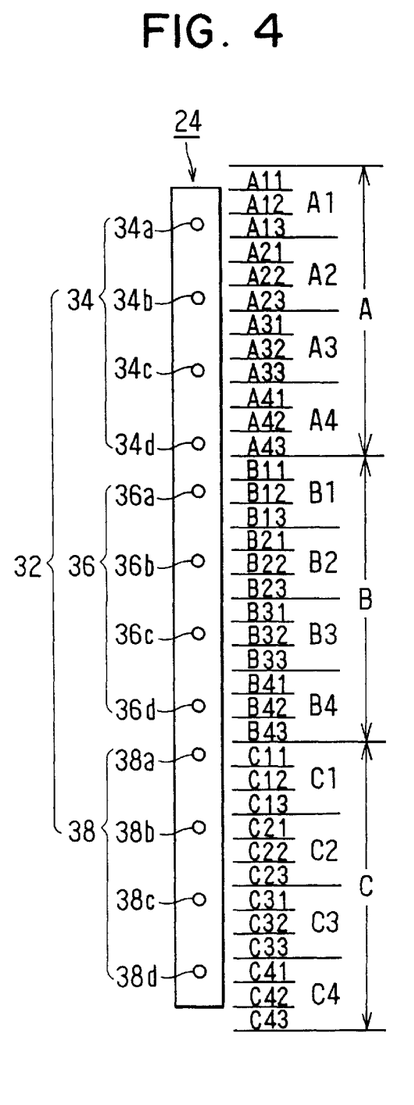
FIG. 4 is a diagram showing the arrangement of nozzles of the printing head according to a second embodiment of the present invention.

As shown in FIG. 4, the second embodiment differs from the first embodiment in the arrangement of nozzles 34a, 34b, 34c, 34d, 36a, 36b, 36c, 36d, 38a, 38b, 38c, 38d of groups 34, 36, 38 of a nozzle 32 of a printing head 24, respectively.

Specifically, in the first group 34 of the nozzle 32, the nozzle 34a is formed in the third arrangement nominated section A13 of the three arrangement nominated sections A11, A12, A13 of the individual arrangement section A1. Also in other individual arrangement sections A2, A3, A4, the nozzles 34b, 34c, 34d are formed in the third arrangement nominated sections A23, A33, A43.

In the second group 36 of the nozzle 32, the nozzle 36a is formed in the second arrangement nominated section B12 within the three arrangement nominated sections B11, B12, B13 in the individual arrangement section B1. Also in other individual arrangement sections B2, B3, B4, the nozzles 36b, 36c, 36d are formed in the second arrangement nominated sections B22, B32, B42, respectively.

In the third group 38 of the nozzle 32, the nozzle 38a is formed in the first arrangement nominated section C11 within the three arrangement nominated sections C11, C12, C13 in the individual arrangement section C1. Also in other individual arrangement sections C2, C3, C4, the nozzles 38b, 38c, 38d are formed in the first arrangement nominated sections C21, C31, C41, respectively.

This arrangement relationship of the nozzles 32 conforms to the relationship described in the first embodiment.

Figure 5:
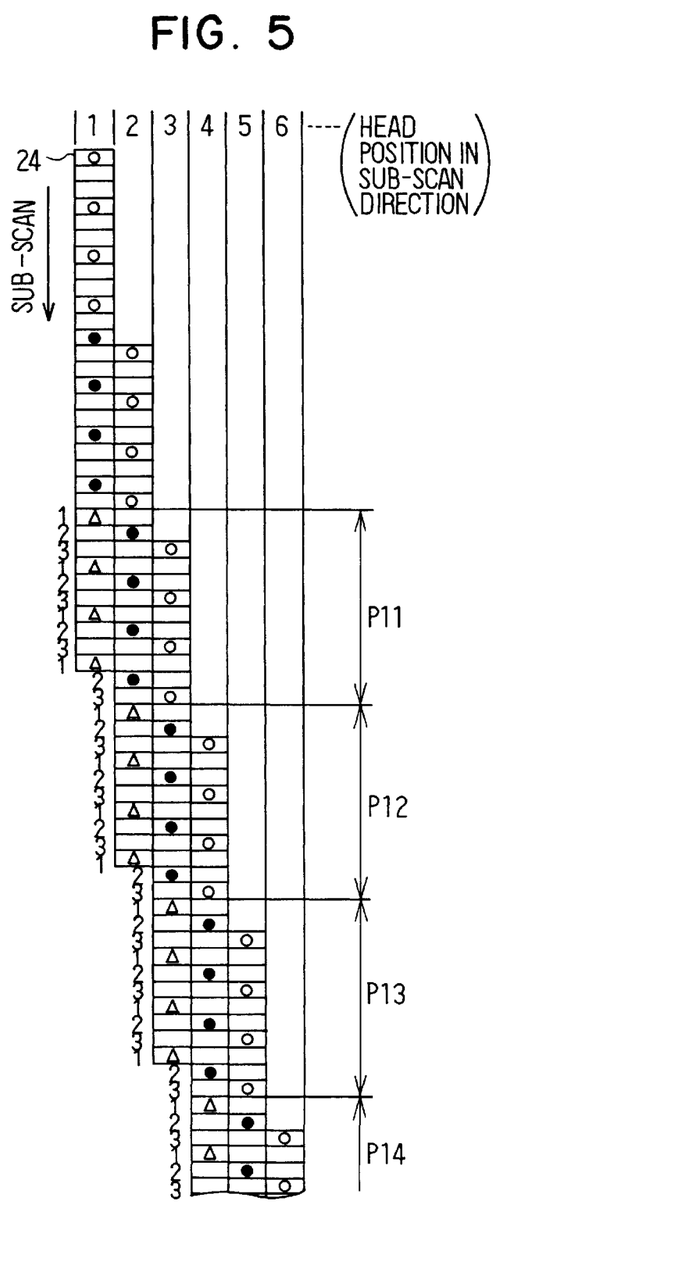
FIG. 5 is a diagram showing the printed state provided when image data is printed by using a printing head assembly of the second embodiment according to the interlace drive system.

FIG. 5 shows the printed state provided when image data is printed by using the printing head assembly 2 thus arranged in the interlace drive system in which image data is printed in the main scanning direction at each position by using the printing head assembly 2 each time the printing head is moved relatively by a length of one arrangement nominated section in the sub-scanning direction. In this case, only one printing head 24 within the printing head assembly 2 is illustrated for brevity.

The printing head assembly 2 overlappingly prints the first overlapping section P11 three times by the interlace drive system in the sequential order of 3s+1-th line, 3s+2-th line, 3(s+1)-th line (s is an integer not less than 0) (i.e., sequential order of "123"). The printing head assembly 2 prints the next overlapping area P12 in the sequential order of 3s+1-th line, 3s+2-th line, 3(s+1)-th line similarly to the first overlapping section P11. The printing head assembly 2 hereinafter will print all of the overlapping areas P13, P14, . . . , in the sequential order of 3s+1-th line, 3s+2-th line, 3(s+1)-th line similarly to the first overlapping area P11.

In the printing executed by the nozzle array shown in FIG. 18 and in accordance with the interlace drive system, ink is jetted in the different sequential orders in the overlapping areas R11 to R14 with the result that striped patterns are produced in the sections of the same color. However, when image data is printed by using the printing head assembly according to the second embodiment of the present invention in the interlace drive system, it is possible to prevent striped patterns from being produced.

As compared with the first embodiment, in the ink supplying portion arrangement section A provided at the upper end of the printing head 24, since the nozzles 34a to 34d are respectively formed in the third arrangement nominated sections A13, A23, A33, A43 within the individual arrangement sections A1 to A4, the arrangement nominated sections A11, A12 exist at the upper portion of the nozzle 34a within the individual arrangement section A1. The two arrangement nominated sections A11, A12 need not be thoroughly filled with a material which makes the printing head 24. Therefore, as shown in FIG. 4, the material which makes the printing head 24 is not provided in the arrangement nominated section A11. Furthermore, in the ink supplying portion arrangement section C provided at the lower end of the printing head 24, since the nozzles 38a to 38d are respectively formed in the first arrangement nominated sections C11, C21, C31, C41 within the individual arrangement sections C1 to C4, the arrangement nominated sections C42, C43 exist at the lower portion of the nozzle 38d within the individual arrangement section C4. The two arrangement nominated sections C42, C43 need not be thoroughly filled with the material which makes the printing head 24. Therefore, as shown in FIG. 4, the material which makes the printing head 24 is not provided in the arrangement nominated section C43.

According to the second embodiment, as compared with the first embodiment, since the length from the upper end to the lower end can be reduced, the printing head 24 can be miniaturized in size and the whole of the printing head assembly also can be miniaturized in size.

Third Embodiment

Figure 6:
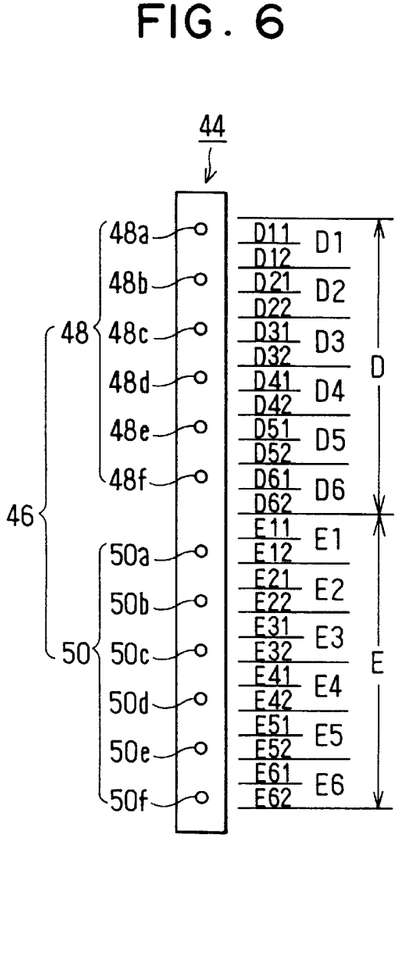
FIG. 6 is a diagram showing arrangement of nozzles of a printing head according to a third embodiment of the present invention.

As shown in FIG. 6, the third embodiment differs from the first and second embodiments in that a nozzle 46 of a printing head 44 comprises two groups 48, 50.

The first group 48 of the nozzle 46 comprises 6 individual arrangement sections D1, D2, D3, D4, D5, D6, and the individual arrangement sections D1 to D6 each comprise two arrangement nominated sections D11, D12, D21, D22, D31, D32, D41, D42, D51, D52, D61, D62.

The second group 50 comprises 6 individual arrangement sections E1, E2, E3, E4, E5, E6, and the individual arrangement sections E1 to E6 each comprise two arrangement nominated sections E11, E12, E21, E22, E31, E32, E41, E42, E51, E52, E61, E62.

A nozzle 48a of the group 48 is formed in the first arrangement nominated section D11 of the two arrangement nominated sections D11, D12. Also in other individual arrangement sections D2 to D6, nozzles 48b, 48c, 48d, 48e, 48f are formed in the first arrangement nominated sections D21, D31, D41, D51, D61, respectively.

In the second group 50, a nozzle 50*a* is formed in the second arrangement nominated section E12 of the two arrangement nominated sections E11, E12. Also in other individual arrangement sections E2 to E6, nozzles 50*b*, 50*c*, 50*d*, 50*e*, 50*f* are formed in the second arrangement nominated sections E22, E32, E42, E52, E62.

This arrangement relationship in the nozzle 46 is the same as that described in the first embodiment.

Figure 7:
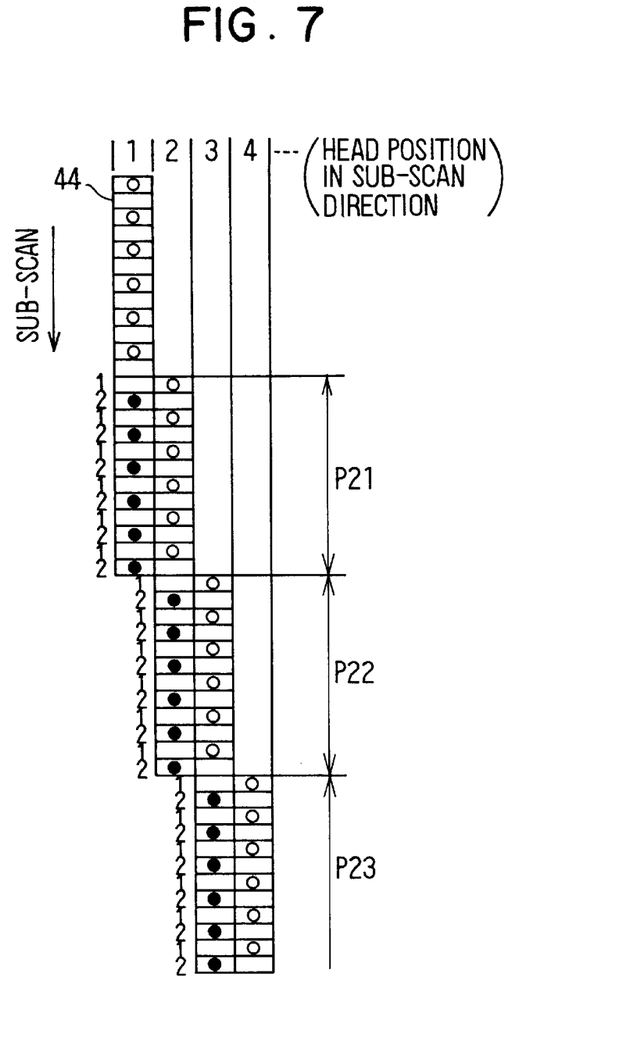
FIG. 7 is a diagram showing the printed state provided when image data is printed by using a printing head of the third embodiment according to the interlace drive system.

FIG. 7 shows the printed state provided when image data is printed by using the printing head assembly 2 thus arranged in the interlace drive system in which image data is printed in the main scanning direction at each position by using the printing head assembly 2 each time the printing head is moved relatively by a length of one arrangement nominated section in the sub-scanning direction. In this case, only one printing head 44 within the printing head assembly 2 is illustrated for brevity.

The first printing overlapping section P21 is printed by the printing head assembly 2 according to the interlace drive system in the sequential order of 2(s+1)-th line and 2s+1-th line [s is an integer not less than 0] (i.e., in the sequential order of "21"). The next overlapping section P22 also is printed in the sequential order of 2(s+1)-th line and 2s+1-th line similarly to the first overlapping section P21. All overlapping sections P23, . . . , will be printed in the sequential order of 2(s+1)-th line and 2s+1-th line similarly to the first overlapping area.

In the printing executed by the nozzle array shown in FIG. 17 and in accordance with the interlace drive system, ink is jetted in the different sequential orders in the overlapping areas R1 to R3 with the result that striped patterns are produced in the sections of the same color. However, when image data is printed by using the printing head assembly according to the third embodiment of the present invention in the interlace drive system, it is possible to prevent striped patterns from being produced.

Fourth Embodiment

Figure 8:
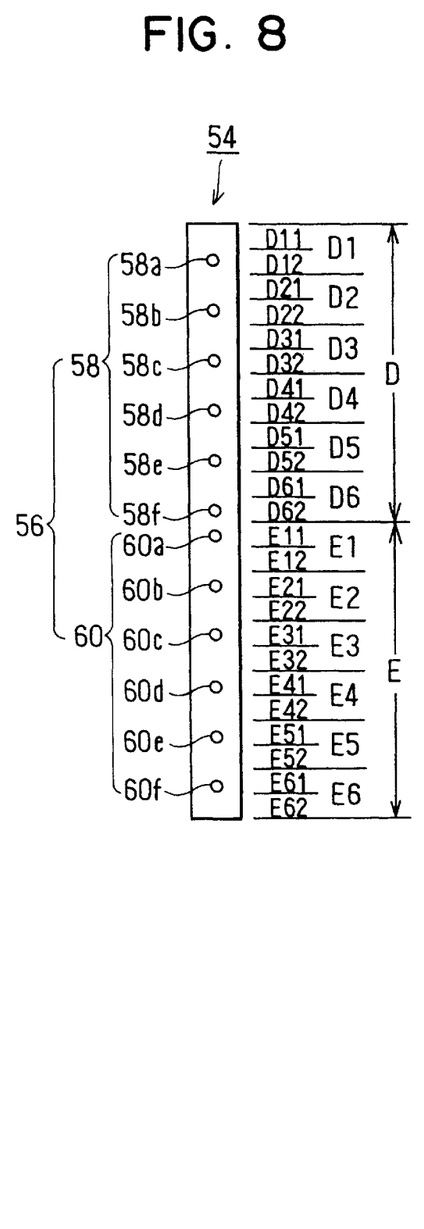
FIG. 8 is a diagram showing of nozzles of a printing head according to a fourth embodiment of the present invention.

According to the fourth embodiment, as shown in FIG. 8, a nozzle 56 of a printing head 54 comprises two groups 58, 60. The fourth embodiment differs from the third embodiment in the manner in which nozzles 58*a*, 58*b*, 58*c*, 58*d*, 58*e*, 58*f*, 60*a*, 60*b*, 60*c*, 60*d*, 60*e*, 60*f* are located in the groups 58, 60.

Specifically, the nozzle 58*a* of the group 58 is formed in the second arrangement nominated section D12 within the two arrangement nominated sections D11, D12. Also in other individual arrangement sections D2 to D6, the nozzles 58*b*, 58*c*, 58*d*, 58*e*, 58*f* are formed in the second arrangement nominated sections D22, D32, D42, D52, D62, respectively.

In the second group 60, a nozzle 60*a* is formed in the first arrangement nominated section E11 of the two arrangement nominated sections E11, E12. Also in other individual arrangement sections E2 to E6, nozzles 60*b*, 60*c*, 60*d*, 60*e*, 60*f* are formed in the first arrangement nominated sections E21, E31, E41, E51, E61, respectively.

That is, this arrangement relationship of this nozzle 56 is the same as in the first embodiment.

Figure 9:
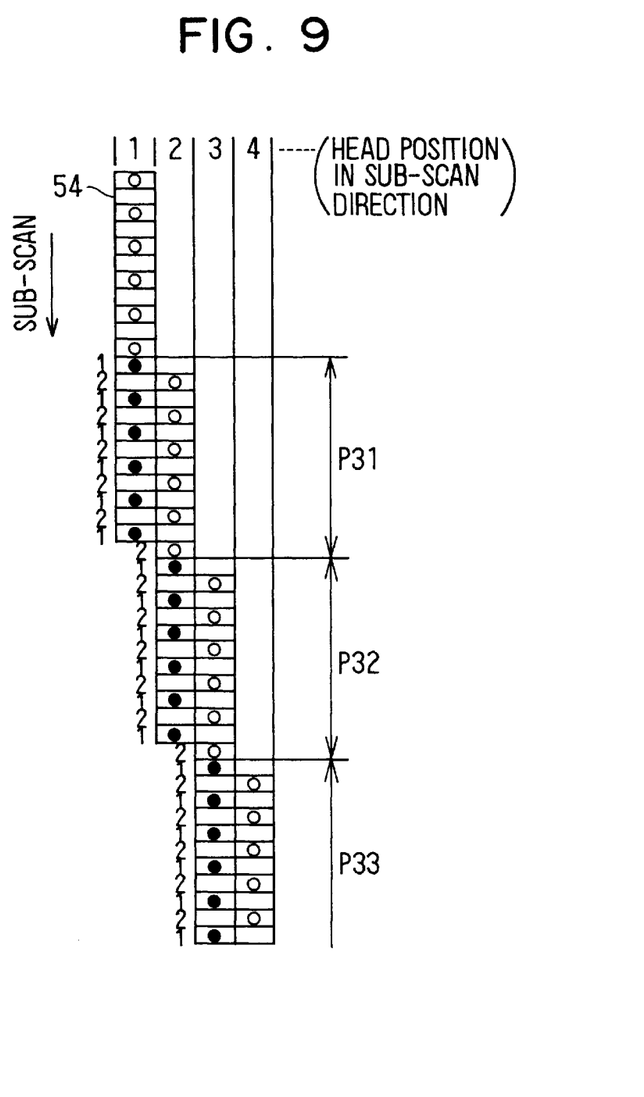
FIG. 9 is a diagram showing the printed state provided when image data is printed by using a printing head of the fourth embodiment according to the interlace drive system.

FIG. 9 shows the printed state provided when image data is printed by using the printing head assembly 2 thus arranged in the interlace drive system in which image data is printed in the main scanning direction at each position by using the printing head assembly 2 each time the printing head is moved relatively by a length of one arrangement nominated section in the sub-scanning direction. In this case, only one printing head 54 within the printing head assembly 2 is illustrated for brevity.

The printing head assembly 2 prints the first overlapping section P31, which is printed overlappingly, according to the interlace drive system in the sequential order of 2s+1-th line, 2(s+1)-th line [s is an integer not less than 0] (i.e., in the sequential order of "12"). The printing head assembly 2 prints the next overlapping section P32 in the sequential order of 2s+1-th line, 2(s+1)-th line similarly to the first overlapping section P31. Hereinafter, the printing head assembly 2 will print all overlapping section P33, . . . , in the sequential order of 2s+1-th line, 2(s+1)-th line similarly to the first overlapping section P31.

The fourth embodiment can achieve effects similar to those of the third embodiment. Moreover, in the ink supplying portion arrangement sections D, E on the upper and lower ends of the printing head 54, the material forming the printing head 54 can be reduced similarly to the second embodiment. Thus, as compared with the third embodiment, according to the fourth embodiment, since the length from the upper end to the lower end can be shortened, the printing head 54 can be reduced in size, and the whole of the printing head assembly can be reduced in size.

Fifth Embodiment

Figure 10:
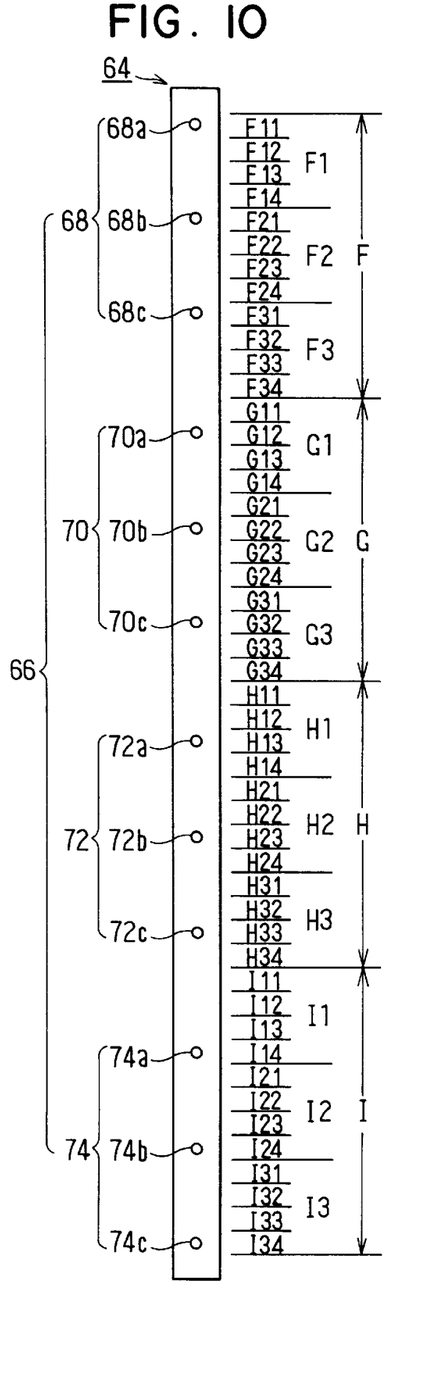
FIG. 10 is a diagram showing of nozzles of a printing head according to a fifth embodiment of the present invention.

As shown in FIG. 10, the fifth embodiment differs from the aforementioned first to fourth embodiments in that a nozzle 66 of a printing head 64 comprises four groups 68, 70, 72, 74.

The first group 68 of the nozzle 66 is disposed in an ink supplying portion arrangement section F located at the upper end. The ink supplying portion arrangement section F comprises three individual arrangement sections F1, F2, F3, and the individual arrangement sections F1 to F3 each comprise four arrangement nominated sections F11, F12, F13, F14, F21, F22, F23, F24, F31, F32, F33, F34.

The second group 70 is disposed in the second ink supplying portion arrangement section G from the above. The ink supplying portion arrangement section G comprises three individual arrangement sections G1, G2, G3, and the individual arrangement sections G1 to G3 each comprise four arrangement nominated sections G11, G12, G13, G14, G21, G22, G23, G24, G31, G32, G33, G34.

The third group 72 is disposed in a third ink supplying portion arrangement section H from the above. This ink supplying portion arrangement section H comprises three individual arrangement sections H1, H2, H3, and the individual arrangement sections H1 to H3 each comprise four arrangement nominated sections H11, H12, H13, H14, H21, H22, H23, H24, H31, H32, H33, H34.

The fourth group 74 is disposed in an ink supplying portion arrangement section I located at the lower end. This ink supplying portion arrangement section I comprises three individual arrangement sections I1, I2, I3, and the individual arrangement sections I1 to I3 each comprise four arrangement sections I11, I12, I13, I14, I21, I22, I23, I24, I31, I32, I33, I34.

In the first group 68, the nozzle 68*a* is formed in the first arrangement nominated section F1 within the four arrangement nominated sections F11 to F14. In other individual arrangement sections F2, F3, the nozzles 68*b*, 68*c* are formed in the first arrangement nominated sections F21, F31, respectively.

In the second group 70, the nozzle 70*a* is formed in the second arrangement nominated section G12 within the four arrangement nominated sections G11 to G14. In other individual arrangement sections G2, G3, the nozzles 70*b*, 70*c* are formed in the second arrangement nominated sections G22, G32, respectively.

In the third group 72, the nozzle 72*a* is formed in the third arrangement nominated section H13 within the four arrangement nominated sections H11 to H14. In other individual arrangement sections H2, H3, the nozzles 72b, 72c are formed in the third arrangement nominated sections H23, H33, respectively.

In the fourth group 74, the nozzle 74a is formed in the fourth arrangement nominated section I14 within the four arrangement nominated sections I11 to I14. In other individual arrangement sections I12, I13, the nozzles 74b, 74c are formed in the fourth arrangement nominated sections I24, I34, respectively.

This arrangement relationship of this nozzle 66 is the same as in the first embodiment.

Figure 11:
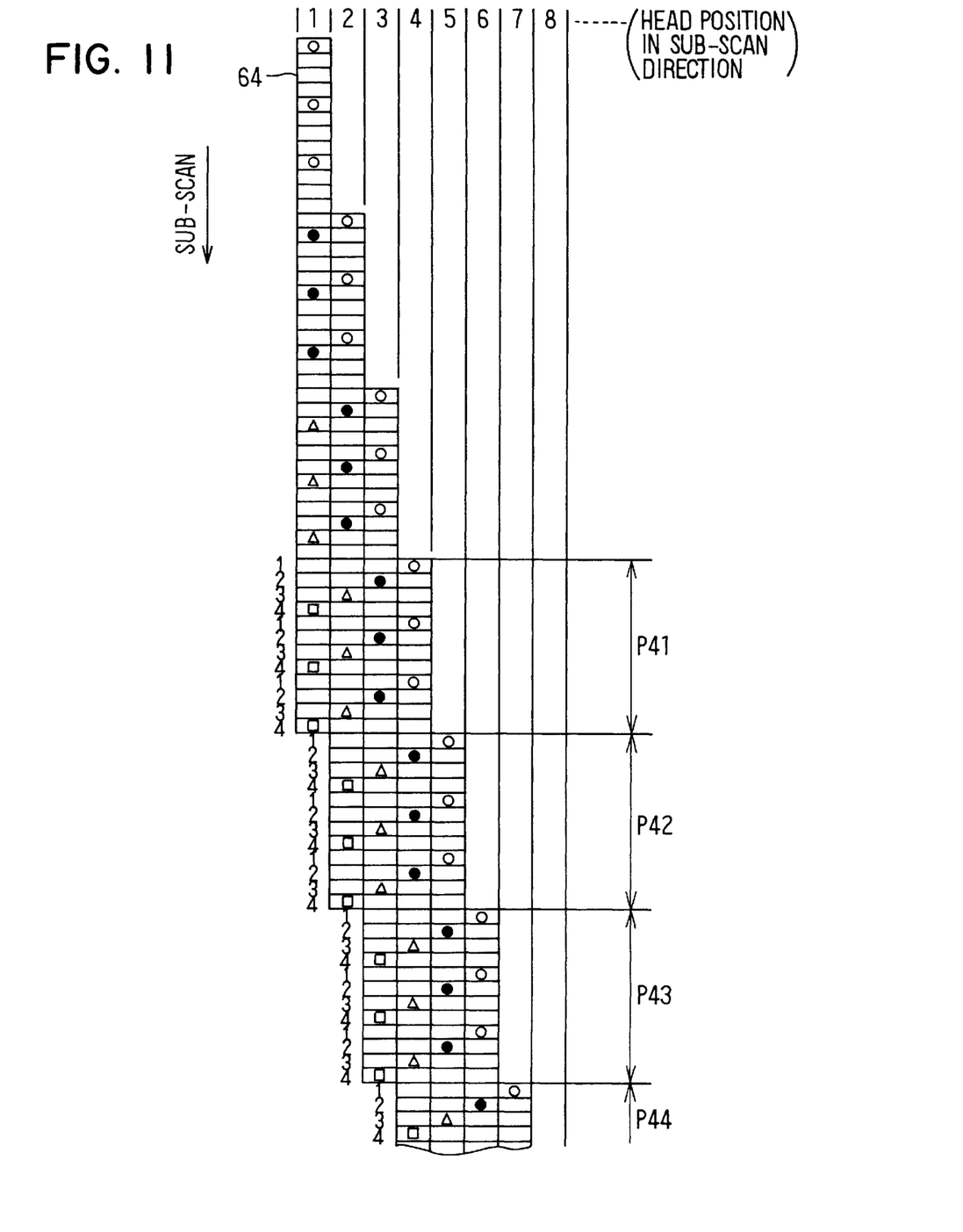
FIG. 11 is a diagram showing the printed state provided when image data is printed by using a printing head assembly of the fifth embodiment according to the interlace drive system.

FIG. 11 shows the printed state provided when image data is printed by using the printing head assembly 2 thus arranged in the interlace drive system in which image data is printed in the main scanning direction at each position by using the printing head assembly 2 each time the printing head is moved relatively by a length of one arrangement nominated section in the sub-scanning direction. In this case, only one printing head 64 within the printing head assembly 2 is illustrated for brevity.

The printing head assembly 2 prints overlappingly the first overlapping area P41 four times according to the interlace drive system in the sequential order of 4(s+1)-th line, 4s+3-th line, 4s+2-th line and 4s+1-th line [s is an integer not less than 0] (i.e., in the sequential order of "4321"). The printing head assembly 2 prints the next overlapping area P42 in the sequential order of 4(s+1)-th line, 4s+3-th line, 4s+2-th line, is 4s+1-th line similarly to the first overlapping area P41. The printing head assembly 2 will print all of the following overlapping areas P43, P44, . . . in the sequential order of 4(s+1)-th line, 4s+3-th line, 4s+2-th line, 4s+1-th line similarly to the first overlapping area P41.

According to this printing, in all print sections, the inks can be constantly overlapped in the sequential order. Thus, even when ink jets of specific ink are deviated in odd-numbered lines or even-numbered lines or a specific ink is jetted at every four lines, it is possible to prevent striped patterns from being produced.

Sixth Embodiment

Figure 12:
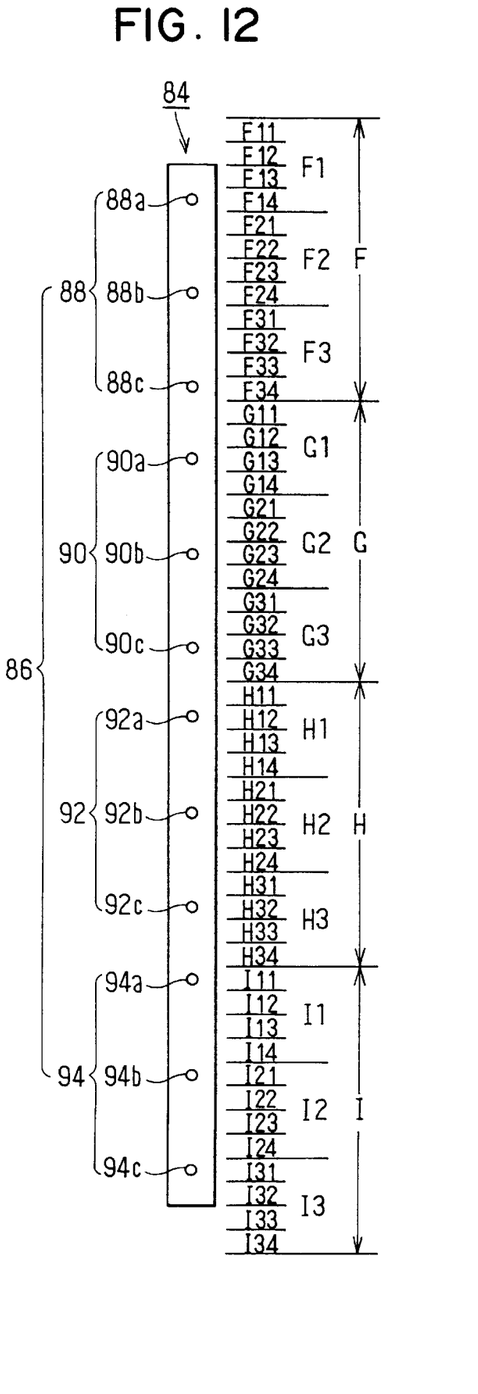
FIG. 12 is a diagram showing of nozzles of a printing head according to a sixth embodiment of the present invention.

As shown in FIG. 12, the sixth embodiment is similar to the fifth embodiment in that a nozzle 86 of a printing head 84 comprises four groups 88, 90, 92, 92 but differs from the fifth embodiment in the layout of the nozzle 86.

In the first group 88, a nozzle 88a is formed in a fourth arrangement nominated section F14 in four arrangement nominated sections F11 to F14. In other individual arrangement sections F2, F3, nozzles 88b, 88c are formed in fourth arrangement nominated sections F24, F34, respectively.

In the second group 90, a nozzle 90a is formed in a third arrangement nominated section G13 within four arrangement nominated sections G11 to G14. In other individual arrangement sections G2, G3, nozzles 90b, 90c are formed in third arrangement nominated sections G23, G33, respectively.

In the third group 92, a nozzle 92a is formed in a second arrangement nominated section H12 within four arrangement nominated sections H11 to H14. In other individual arrangement sections H2, H3, nozzles 92b, 92c are formed in second arrangement nominated sections H22, H32, respectively.

In the fourth group 94, a nozzle 94a is formed in a first arrangement nominated section I11 within four arrangement nominated sections I11 to I14. In other individual arrangement sections I2, I3, nozzles 94b, 94c are formed in first arrangement nominated sections I21, I31, respectively.

This arrangement relationship of this nozzle 86 is the same as in the first embodiment.

Figure 13:
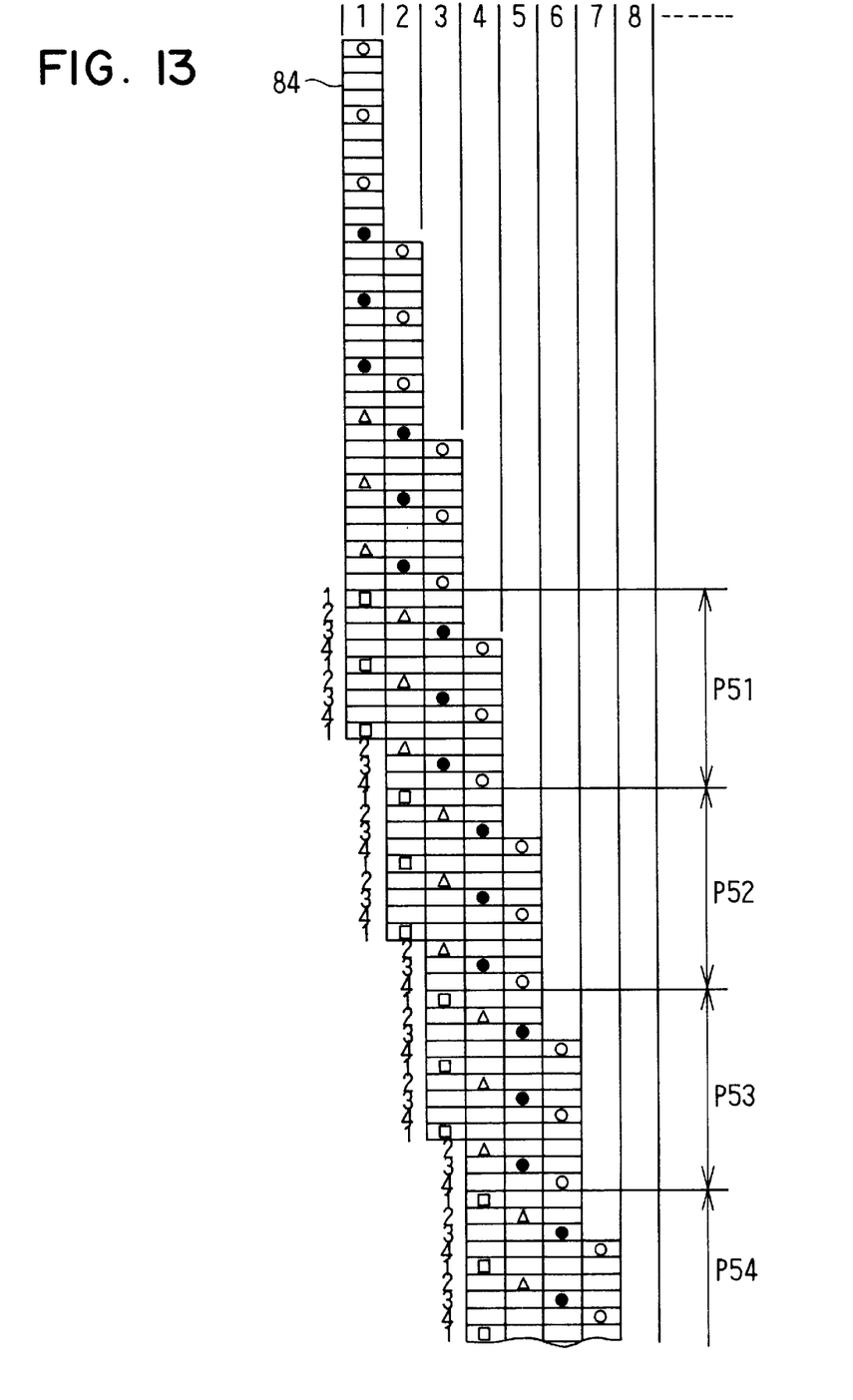
FIG. 13 is a diagram showing the printed state provided when image data is printed by using a printing head of the sixth embodiment according to the interlace drive system.

FIG. 13 shows the printed state provided when image data is printed by using the printing head assembly 2 thus arranged in the interlace drive system in which image data is printed in the main scanning direction at each position by using the printing head assembly 2 each time the printing head is moved relatively by a length of one arrangement nominated section in the sub-scanning direction. In this case, only one printing head 84 within the printing head assembly 2 is illustrated for brevity.

The printing head assembly 2 prints overlappingly the first overlapping area P51 four times according to the interlace drive system in the sequential order of 4s+1-th line, 4s+2-th line, 4s+3-th line and 4(s+1)-th line [s is an integer not less than 0] (i.e., in the sequential order of "1234"). The printing head assembly 2 prints the next overlapping area P52 in the sequential order of 4s+1-th line, 4s+2-th line, 4s+3-th line, 4(s+1)-th line similarly to the first overlapping area P51. The printing head assembly 2 will print all of the following overlapping areas P53, P54, . . . in the sequential order of 4s+1-th line, 4s+2-th line, 4s+3-th line, 4(s+1)-th line similarly to the first overlapping area P51.

The sixth embodiment can achieve effects similar to those of the fifth embodiment. Moreover, in the ink supplying portion arrangement sections F, I on the upper and lower ends of the printing head 84, the material forming the printing head 84 can be reduced similarly to the fifth embodiment. Thus, as compared with the fifth embodiment, according to the sixth embodiment, since the length from the upper end to the lower end can be shortened, the printing head 84 can be reduced in size, and the whole of the printing head assembly can be reduced in size.

Furthermore, while the number P of the ink supplying portion arrangement sections lies in a range of from 2 to 4 and the number n of the nozzles formed in each ink supplying portion arrangement section lies in a range of from 3 to 6 as described in the first to sixth embodiments, the present invention is not limited thereto. Thus, so long as the arrangement relationship of the nozzles in the first embodiment is satisfied, the number of the ink supplying portion arrangement sections and the number of the nozzles may be arbitrarily selected from a combination of any numerical values.

The present invention having been described should not limited to the disclosed embodiments but may be modified and altered without departing from the spirit of the invention.

I claim:

1. A printing head movable in a main scanning and sub-scanning directions, the printing head comprising:

a first predetermined number of ink supplying portions arranged to be used effectively for printing, the first predetermined number being an integer n which is not less than 1;

a second predetermined number of ink supplying portion arrangement sections arranged continuously in a sub-scanning direction, the second predetermined number being an integer P which is not less than 2, each of the ink supplying portion arrangement sections having a length L in the sub-scanning direction to cover the first predetermined number of ink supplying portions;

individual arrangement sections disposed in each of the ink supplying portion arrangement sections, the number of the individual arrangement sections being equal to the first predetermined number n so that each has a length L/n in the sub-scanning direction equally;

arrangement nominated sections disposed in each of the individual arrangement sections, the number of the arrangement nominated sections being equal to the second predetermined number P so that each has a length L/(n×P) in the sub-scanning direction equally;

each of the ink supplying portions being disposed at m-th one of the arrangement nominated sections in each of the individual arrangement sections; and the number m being the same throughout each of the ink supplying portion arrangement sections and different among the ink supplying portion arrangement sections.

2. The printing head according to claim 1, wherein:

the ink supplying portion arrangement sections are disposed without overlapping with each other in the main scanning direction.

3. The printing head according to claim 1, wherein:

each of the ink supplying portions includes an ink-jet nozzle for jetting ink.

4. The printing head according to claim 1, wherein the ink supplying portion arrangement sections are disposed linearly.

5. The printing head according to claim 4, wherein the ink supplying portion arrangement sections are disposed linearly in the sub-scanning direction.

6. An image data printing method using the printing head according to claim 1, the method comprising the steps of:

providing the printing head at a plurality of locations in the main scanning direction to form a printing head assembly so that each printing head supplies color ink different from each other; and moving the printing head assembly relatively by the length L in the sub-scanning direction against a printable medium for printing a color image in the main scanning direction at each moved position of the printing head assembly according to an interlace drive system.

* * * * *